United States Patent Office 2,905,695
Patented Sept. 22, 1959

2,905,695

SULFUR-CONTAINING HEXACHLORO-NAPHTHALENES

Jack H. Thelin, Somerville, N.J., assignor to American Cyanamid Company, New York, N.Y., a corporation of Maine No Drawing. Application November 30, 1955
Serial No. 550,192

6 Claims. (Cl. 260—327)

This invention relates to new sulfur-containing compounds. More particularly, it relates to compounds considered to have the formulae

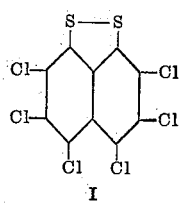

and

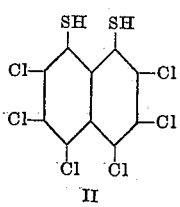

to the zinc salt of Compound II and a monovalent organic acid such as formic, acetic, propionic and the like, and the preparation of such compounds.

The compounds of this invention have been found useful for various purposes. Besides their use as chemical intermediates, they find particular use as rubber chemicals. Specifically, they have been found to be rubber plasticizers.

The new compound, 3,4,5,6,7,8-hexachloro-naphtho [1.8]-1,2-dithiole (I), is prepared by reacting a metal polysulfide with octachloronaphthalene in an organic solvent at elevated temperatures. While the procedure has been simply stated, there are certain factors which should be noted.

With respect to the reactants, it should be pointed out that the grade of octachloronaphthalene employed is not of particular significance to the reaction. Thus it may be employed in substantially pure form or in a readily available commercial grade. The starting polysulfide may be widely varied. Any of the alkali metal or alkaline earth metals which are soluble in the organic solvent may be employed. Preferably, a sodium polysulfide is employed and particularly one comprising one mol of $Na_2S$ and 1.3 mols of sulfur.

Other sodium polysulfides may also be conveniently employed, however, such as $Na_2S_2$, $Na_2S_3$ and even higher polysulfides.

Any organic polar or nonpolar solvent may be employed such as aliphatic hydrocarbons, benzene and its homologues and their halogenated derivatives and the like. A highly satisfactory solvent comprises a hydrocarbon of the benzene series such as benzene, toluene, xylene or naphthalene mixed with an alcohol. A preferred solvent for the reaction comprises a mixture of benzene and alcohol.

The ratio of reactants may vary widely. It may be such as to provide a mol ratio of sulfur to octachloronaphthalene of as high as 8:1. Usually, however, the mol ratio will be less than this, a good practice being from about 3:1–5:1, preferably 4:1.

The reaction proceeds readily at temperatures ranging from about 50° C. up to the reflux temperature of the solvent, the latter being the preferred operating temperature. The time required for completion of the reaction to give the disulfide linkage varies with the temperature employed as well as the nature and ratio of reactants. Usually, the reaction is complete in 1–4 hours but in some instances may require a longer period. On completion of the reaction, the reaction mixture is allowed to cool and is stirred until crystallization of 3,4,5,6,7,8-hexachloronaphtho [1.8]-1,2-dithiole is complete. The product is then separated as by filtration, washed with water until by-product chloride is removed, and dried. In this form it is of sufficient purity for most purposes but may be recrystallized if desired from a suitable polar solvent such as dioxane or mononitrobenzene.

The zinc salt of 1,8-dimercaptohexachloronaphthalene may be prepared by reducing 3,4,5,6,7,8-hexachloronaphtho [1.8]-1,2-dithiole with zinc dust. The free compound (II) may then be prepared by reacting the zinc salt with an alkali followed by treatment with an acid.

The following examples further illustrate the invention. Unless otherwise noted, all parts are by weight.

EXAMPLE 1

*Preparation of 3,4,5,6,7,8-hexachloro-naphtho [1.8]-1,2-dithiole*

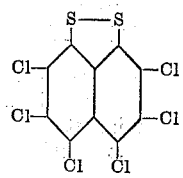

To a mixture comprising 300 parts of benzene and 100 parts of 2B alcohol (anhydrous ethanol containing 2% benzene) is added 40 parts of octachloronaphthalene. Resultant mixture is then heated to reflux and 17.2 parts of finely ground anhydrous sodium polysulfide comprising one mol of $Na_2S$ and 1.3 mols of sulfur added over a three-hour period. Heating at reflux is continued until the reaction is complete. The reaction mixture is then cooled, filtered, and the filter cake washed with water and dried to give 27.5 parts of 3,4,5,6,7,8-hexachloro-naphtho [1.8]-1,2-dithiole. Crystallization from dioxane gives bright orange crystals having a melting point of 275–277° C. uncorr.

| Analysis | Found | Theory |
|---|---|---|
| C | 29.2 | 30.2 |
| Cl | 53.7 | 53.6 |
| S | 16.2 | 16.2 |

EXAMPLE 2

*Zinc double salt of 1,8-dimercaptohexachloronaphthalene*

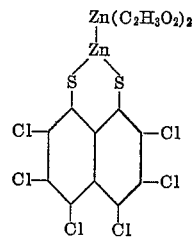

To 350 parts of glacial acetic acid is added 1.83 parts of the product of Example 1. The mixture is heated to boiling and 7.0 parts of zinc dust added gradually at the boil. On completion of the reaction the zinc is separated by filtration and the filtrate mixed with an equal amount of water and cooled. 1.36 parts of product are isolated by filtration and dried.

| Analysis | Found | Theory |
|---|---|---|
| C | 27.1 | 26.0 |
| Cl | 34.8 | 33.0 |
| S | 9.4 | 10.0 |

EXAMPLE 3

*1,8-dimercaptohexachloronaphthalene*

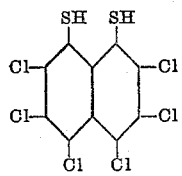

To a mixture comprising 5 parts of water and 1 part by volume of a 5 N sodium hydroxide solution is added 0.3 part of the product of Example 2 and the mixture stirred until conversion to the dimercapto compound is complete. The solution of product is clarified by filtration and acidified with 1 part by volume of 5 N hydrochloric acid. The product is isolated by filtration, washed with water and dried. M.P. 156–180° C.

The following plasticity test was conducted in a Mooney shearing disc plastometer. The readings are viscosity readings after 6 minutes in the plastometer at 212° F. The lower the reading, the greater the plasticity. All parts are by weight unless otherwise noted.

EXAMPLE 4

Two samples of natural rubber, one containing the compound of Example 1, were milled for 10 minutes in a Banbury mixer with the jacket at 286° F. and the rotor at 212° F. Results are shown in Table I.

TABLE I

| | | |
|---|---|---|
| Smoked Sheets | 100 | 100 |
| 3,4,5,6,7,8-hexachloro-naptho-[1.8]-1,2-dithiole | | 0.125 |
| Mooney viscosity at 212°F. (ML-6) | 80 | 70 |

I claim:

1. A compound selected from the group consisting of 3,4,5,6,7,8 - hexachloronaphtho - [1.8] - 1,2 - dithiole, 1,8-dimercapto hexachloronaphthalene and the zinc double salt of 1,8-dimercapto hexachloronaphthalene and a monovalent organic acid selected from the group consisting of formic, acetic and propionic.

2. 3,4,5,6,7,8 - hexachloronaphtho - [1.8] - 1,2 - dithiole.

3. 1,8-dimercapto hexachloronaphthalene.

4. Zinc double salt of 1,8-dimercapto hexachloronaphthalene and a monovalent organic acid selected from the group consisting of formic, acetic and propionic.

5. A method for preparing 3,4,5,6,7,8-hexachloronaphtho [1.8]-1,2-dithiole which comprises reacting octachloronaphthalene in an inert organic solvent with an alkali metal or alkaline earth metal polysulfide soluble in said solvent, said mol ratio of reactants being such as to provide a mol ratio of sulfur: octachloronaphthalene of about 3:1–5:1; said reaction being conducted at a temperature of about 50° C. to the reflux temperature of the solvent, and recovering 3,4,5,6,7,8-hexachloronaphtho-[1.8]-1,2-dithiole thus formed.

6. A process according to claim 5 in which the polysulfide is sodium polysulfide.

References Cited in the file of this patent

UNITED STATES PATENTS

| 2,310,449 | Lightbown | Feb. 9, 1943 |
| 2,409,687 | Rogers | Oct. 22, 1946 |
| 2,695,898 | Lober | Nov. 30, 1954 |
| 2,755,305 | Stucker et al. | July 17, 1956 |

OTHER REFERENCES

Price, J. Chem. Soc., 1928: 2372–74.